United States Patent
Goldstein

[15] 3,690,268
[45] Sept. 12, 1972

[54] CONVEYOR WITH STABILIZING MEANS

[72] Inventor: Albert Goldstein, Southfield, Mich.

[73] Assignee: American Chain & Cable Company, Inc., New York, N.Y.

[22] Filed: April 20, 1971

[21] Appl. No.: 135,646

[52] U.S. Cl..............................104/172 S, 198/177
[51] Int. Cl.............................................B65g 17/42
[58] Field of Search...................104/172 S; 198/177; 214/16.1 BA, 16.1 B, 16.1 BB

[56] References Cited

UNITED STATES PATENTS

| | | | |
|---|---|---|---|
| 3,353,500 | 11/1967 | Orwin | 104/172 S |
| 3,495,545 | 2/1970 | Radovic | 198/177 R |
| 3,517,864 | 6/1970 | Michaels | 198/177 R |

Primary Examiner—Gerald M. Forlenza
Assistant Examiner—R. B. Johnson
Attorney—Barnes, Kisselle, Raisch & Choate

[57] ABSTRACT

A power and free conveyor system including a power track along which a conveyor is movable and a load track along which carriers are movable. Each carrier comprises longitudinally spaced trolleys interconnected by a load bar pivoted thereto. A first guide bar is fixed to and extends laterally from at least one of the trolleys and a second guide bar is fixed to and extends laterally from the load bar. The first guide bar supports a second guide rail thereon which is engaged by the second guide bar. The first guide bar engages a guide rail along any portion of the track. In movement through a curved portion, the second guide bar is movable along the second guide rail to accommodate for the chordal movement of the load bar with respect to the arcuate movement of the trolleys of the carrier.

17 Claims, 4 Drawing Figures

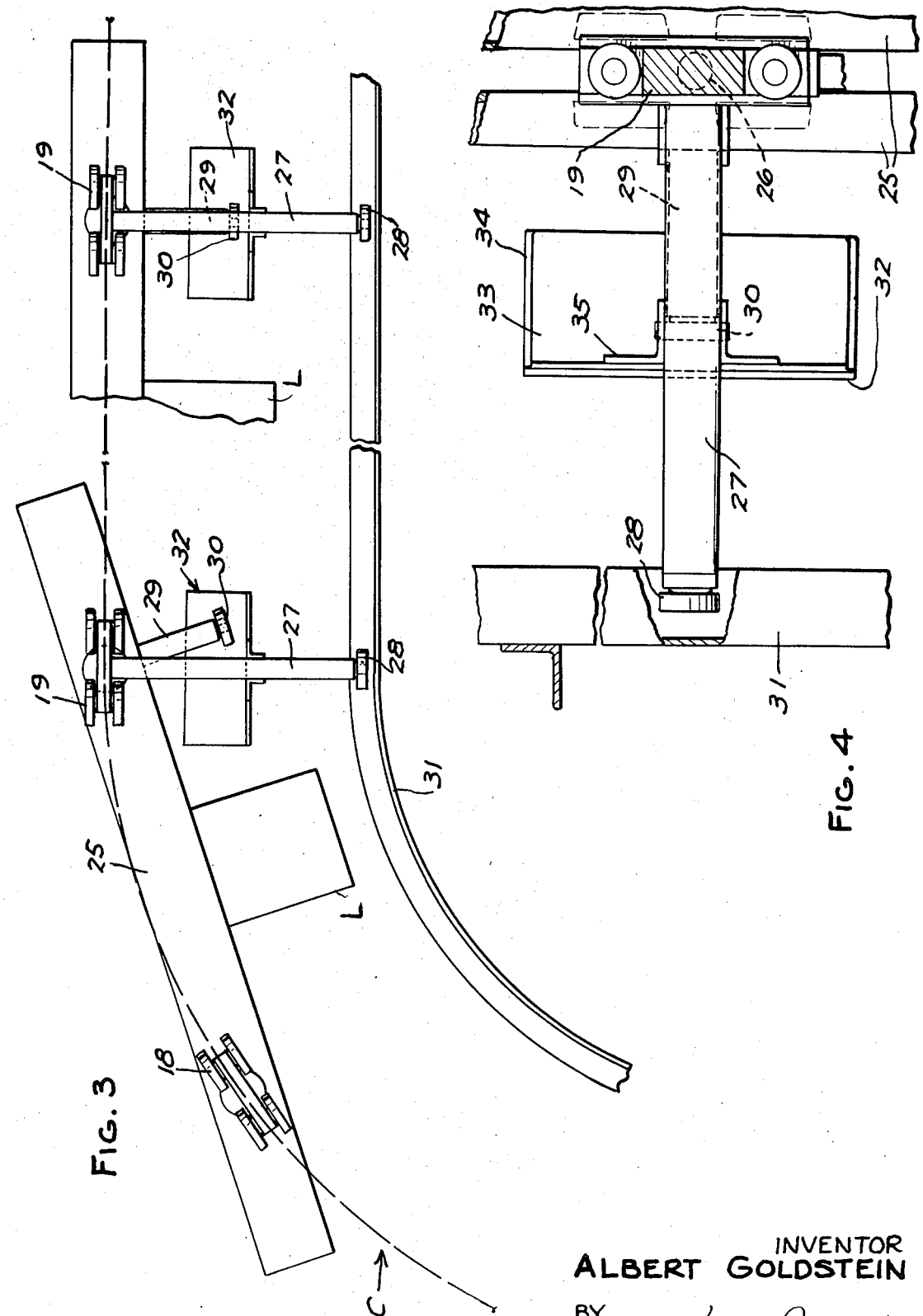

3,690,268

CONVEYOR WITH STABILIZING MEANS

This invention relates to conveyor systems and particularly to conveyor systems for supporting loads that are transversely unbalanced.

BACKGROUND OF THE INVENTION

In overhead conveyor systems such as power and free conveyor systems, a conveyor movable along a power track engages carriers movable along the load or free track to move the load along the track. Where the load is transversely unbalanced, it is necessary to stabilize the load as it is moved along the load track. One of the problems inherent in such stabilization is that in moving around a curved portion of the conveyor track the trolleys tend to follow the curved track, but the load bar interconnecting the trolleys assumes a chordal position with respect to the track.

Among the objects of the invention are to provide a construction wherein the transversely unbalanced load is stabilized without excessive marring or scuffing of any guide rails; wherein the load is transversely stabilized in an efficient and simple manner; and wherein the stabilization is achieved in a positive and efficient manner.

SUMMARY OF THE INVENTION

In accordance with the invention, the power and free conveyor system embodying the invention comprises a first guide bar fixed to and extending laterally from at least one of the trolleys and a second bar fixed to and extending laterally from said load bar. The first guide bar supports a second guide rail thereon which is engaged by the second guide bar. The first guide bar engages a guide rail along the track. In movement through a curved portion, the second guide bar is movable along the second guide rail to accommodate for the chordal movement of the load bar with respect to the arcuate movement of the trolleys of the carrier.

DESCRIPTION OF THE DRAWINGS

FIG. 3 is a fragmentary plan view of the conveyor system in another portion of the system, parts being broken away.

FIG. 4 is a fragmentary part sectional plan view on an enlarged scale of a portion of the system shown in FIG. 3.

DESCRIPTION

Figure 1:
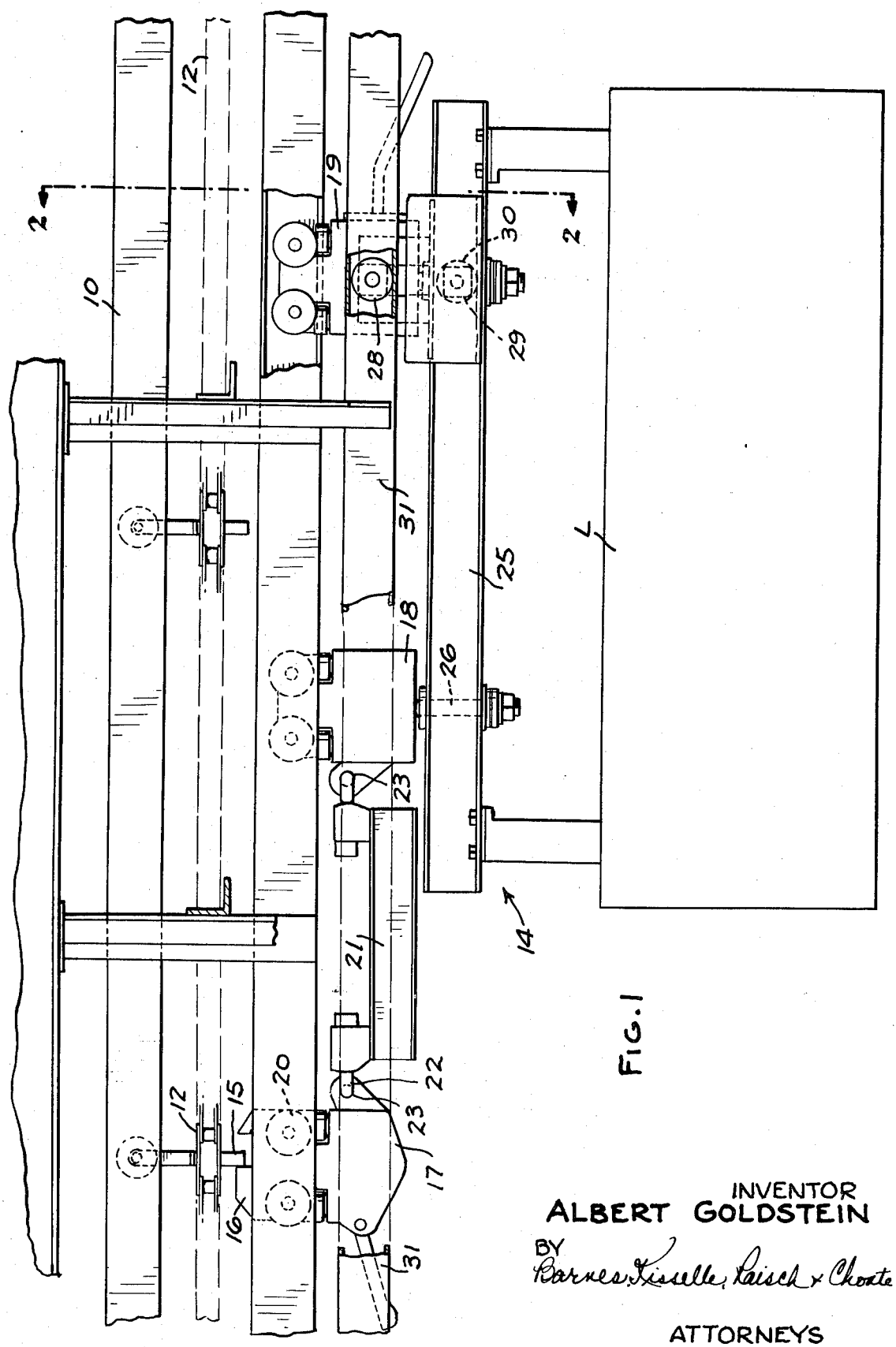
FIG. 1 is a fragmentary part sectional side elevational view of the power and free conveyor system embodying the invention.
Figure 2:
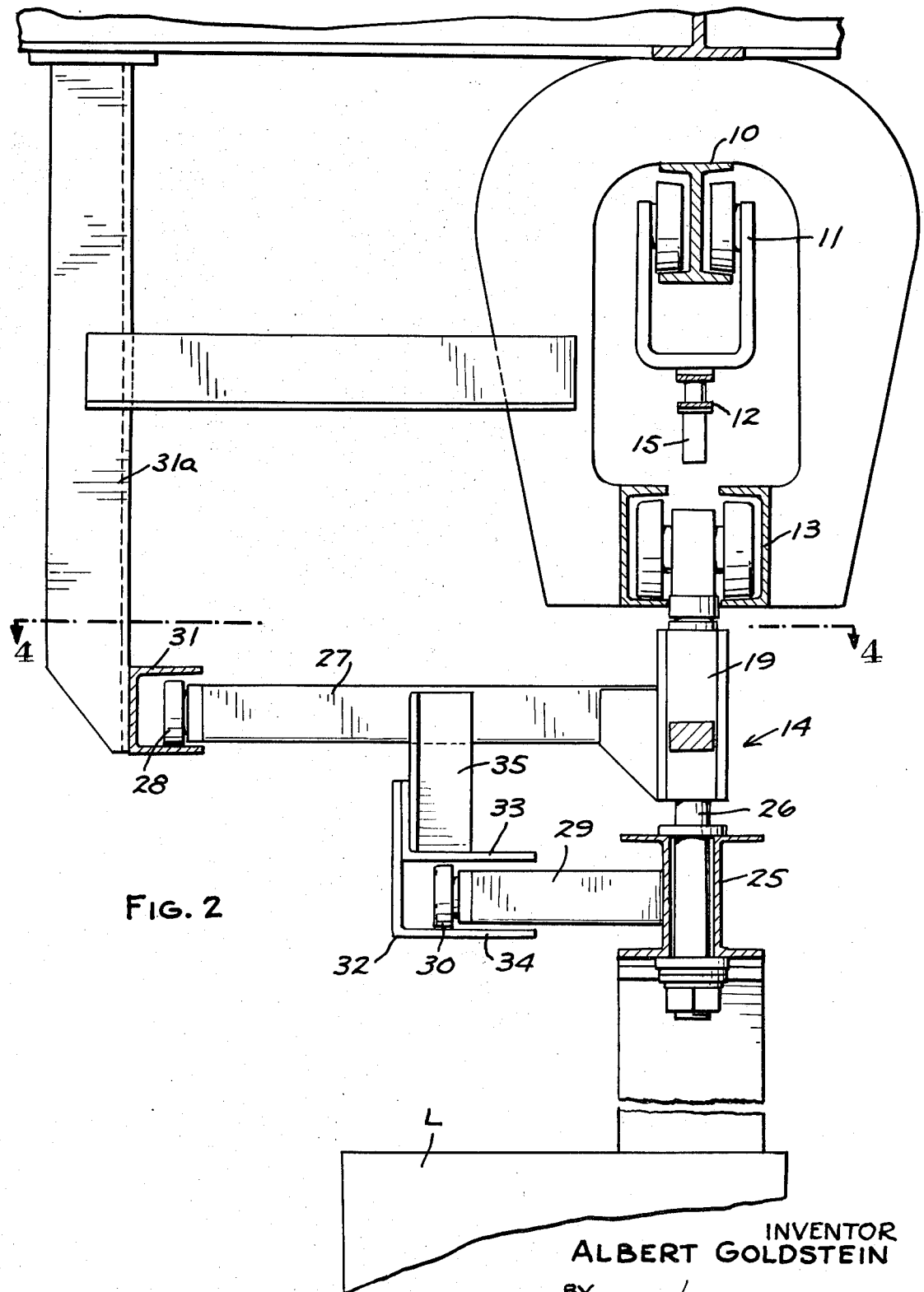
FIG. 2 is a fragmentary sectional view on an enlarged scale taken along the line 2—2 in FIG. 1.

Referring to FIG. 1, the power and free conveyor system embodying the invention comprises a power track 10 having an I-beam cross-section (FIG. 2) along which wheeled trolleys 11 of a power chain 12 are driven. The system further includes a free or load track 13 comprising inwardly facing C-shaped channels. A plurality of carriers 14 are movable along the power track 13 by interengagement of pushers 15 on the chain 12 with pusher dogs 16 on the carrier. The carrier 14 is shown as comprising longitudinally spaced trolleys 17, 18, 19, each of which has wheels 20 engaging the track 13. Trolleys 17, 18 are pivotally interconnected by a tow bar 21 through U-shaped members 22 extending through openings 23 of the trolley. A load bar 25 is pivotally connected to each of the trolleys 18, 19 by a vertical pin 26 about vertical axes. The aforementioned structure is conventional.

As set forth above, the invention is particularly applicable to an arrangement wherein the load L is transversely unsymmetrical or unbalanced so that the center of the load is not vertically below the trolleys 18, 19.

In accordance with the invention, a first guide bar 27 is fixed to and extends horizontally from the body of one or more of the trolleys herein shown on trolley 19 and has a roller 28 on the end thereof for rotation about a horizontal axis. A second guide bar 29 is fixed to and extends horizontally from the load bar 25 and has a roller 30 on the free end thereof mounted for rotation about a horizontal axis.

A first guide rail in the form of a U-shaped laterally opening rail 31 is fixed by a support 31a along the track 13 and extends parallel to the track for continuous engagement by roller 28 of the first guide bar 27. A second shorter guide rail in the form of a horizontal laterally opening rail 32 formed by members 33, 34 is fixed by a vertical support 35 on the first guide bar 27 and is engaged at all times by the roller 30 on the second guide bar 29.

As shown in FIG. 3, as the carrier 14 is moved through the curved portion C of track 13, the trolleys 18, 19 follow the curved portion of the track and the roller 28 of the first guide bar 27 maintains continuous engagement with the first guide rail 31 which is parallel to the portion C, the roller 28 rolling along the guide rail 31. As the load bar 25 assumes a chordal position as shown diagrammatically in FIG. 3, the second guide bar 29 is shifted in relationship to the fixed guide bar, the roller 30 moving along the second guide rail 32. As the chordal position of the load bar continues to change with respect to the trolleys, there will be slight relative movement between the bars 27, 29.

The main force or support for the load will be taken by the first guide bar 27 while the second guide bar 29 merely transmits any lateral load on the load bar to the guide bar 27 rather than through the pin 26. Accordingly, there are minimal bending forces on the pin 26.

I claim:

1. In a conveyor system, the combination comprising
   a track,
   said track having a curved portion,
   at least one carrier on said track,
   said carrier comprising a plurality of longitudinally spaced trolleys engaging said track,
   a load bar,
   means pivotally interconnecting said load bar to said trolleys,
   a first guide bar fixed to one of said trolleys and extending laterally therefrom,
   a second guide bar fixed to said load bar and extending laterally therefrom,
   first guide means mounted in position along said track and engageable by said first guide bar,
   second guide means mounted on said first guide bar and engaged by said second guide bar whereby upon movement of said carrier through a curved portion, said first guide bar engages said first guide means and said second guide bar is maintained in engagement with said second guide means but movable with respect thereto.

2. The combination set forth in claim 1 wherein said first guide means comprises a rail.

3. The combination set forth in claim 2 wherein said rail comprises a generally U-shaped channel into which the end of said first guide bar extends.

4. The combination set forth in claim 1 wherein said second guide means comprises a rail.

5. The combination set forth in claim 4 wherein said guide rail comprises a generally U-shaped channel into which said second guide bar extends.

6. The combination set forth in claim 1 including anti-friction means on each of said first and second guide bars.

7. The combination set forth in claim 1 including a power track extending along said first-mentioned track,
a conveyor movable along said power track,
and interengaging means between said conveyor and said trolley.

8. The combination set forth in claim 1 wherein said first guide arm extends laterally for a greater distance than said second guide arm.

9. In a conveyor system, the combination comprising
a track,
said track having a curved portion
at least one carrier on said track,
said carrier comprising a plurality of longitudinally spaced trolleys engaging said track,
a load bar,
means pivotally interconnecting said load bar to said trolleys for rotation about vertical axes,
a first guide bar fixed to one of said trolleys and extending laterally therefrom,
a second guide bar fixed to said load bar an extending laterally therefrom,
a first guide rail mounted in position along said track and engageable by said first guide bar,
a second guide rail mounted on said first guide bar and engaged by said second guide bar whereby upon movement of said carrier through a curved portion, said first guide bar engages said first guide rail and said second guide bar is maintained in engagement with said second guide rail but movable with respect thereto.

10. The combination set forth in claim 9 wherein each said guide rail comprises a generally U-shaped channel into which its respective guide bar extends.

11. The combination set forth in claim 10 including anti-friction means on the end of each of said first and second guide bars.

12. The combination set forth in claim 9 including a power track extending along said first-mentioned track,
a conveyor movable along said power track,
and interengaging means between said conveyor and said trolley.

13. The combination set forth in claim 9 wherein said first guide arm extends laterally for greater distance than said second guide arm.

14. For use in a conveyor system,
a carrier comprising a plurality of longitudinally spaced trolleys adapted to be moved along a track,
a load bar,
means pivotally interconnecting said load bar to said trolleys,
a first guide bar fixed to one of said trolleys and extending laterally therefrom,
a second guide bar fixed to said load bar and extending laterally therefrom,
a first guide rail adapted to be mounted in position for engagement by said first guide bar,
a second guide rail mounted on said first guide bar and engaged by said second guide bar whereby upon movement of said carrier through a curved portion, said first guide bar engages said first guide rail and said second guide bar is maintained in engagement with said second guide rail but movable with respect thereto.

15. The combination set forth in claim 14 wherein each said guide rail comprises a generally U-shaped channel into which its respective guide bar extends.

16. The combination set forth in claim 14 including anti-friction means on the end of each of said first and second guide bars.

17. The combination set forth in claim 14 wherein said first guide arm extends laterally for greater distance than said second guide arm.

* * * * *